(12) United States Patent
Suyama

(10) Patent No.: US 11,289,114 B2
(45) Date of Patent: Mar. 29, 2022

(54) CONTENT REPRODUCER, SOUND COLLECTOR, CONTENT REPRODUCTION SYSTEM, AND METHOD OF CONTROLLING CONTENT REPRODUCER

(71) Applicant: YAMAHA CORPORATION, Hamamatsu (JP)

(72) Inventor: Akihiko Suyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 268 days.

(21) Appl. No.: 16/426,187

(22) Filed: May 30, 2019

(65) Prior Publication Data
US 2019/0279658 A1    Sep. 12, 2019

Related U.S. Application Data

(63) Continuation of application No. PCT/JP2017/043271, filed on Dec. 1, 2017.

(30) Foreign Application Priority Data

Dec. 2, 2016 (JP) .............................. JP2016-235437

(51) Int. Cl.
*G10L 21/00* (2013.01)
*G10L 25/00* (2013.01)
(Continued)

(52) U.S. Cl.
CPC ................ *G10L 25/87* (2013.01); *G01S 3/80* (2013.01); *G06F 3/167* (2013.01); *G10L 13/00* (2013.01);
(Continued)

(58) Field of Classification Search
CPC ........ G01S 3/80; G01S 3/8055; G01S 3/8083; G06F 3/167; G10L 13/00; G10L 13/02;
(Continued)

(56) References Cited

U.S. PATENT DOCUMENTS 5,010,495 A * 4/1991 Willetts .................... G09B 5/04
434/167
6,259,447 B1 * 7/2001 Kanetake ................ G06F 9/451
715/764
(Continued)

FOREIGN PATENT DOCUMENTS

JP      S53166306 U    12/1978
JP      S61138999 A     6/1986
(Continued)

OTHER PUBLICATIONS

Advisory Action issued in U.S. Appl. No. 15/903,436 dated Jul. 2, 2020.

(Continued)

*Primary Examiner* — Khai N. Nguyen
(74) *Attorney, Agent, or Firm* — Rossi, Kimms & McDowell LLP

(57) ABSTRACT

A content reproducer according to the present disclosure includes a sound collector configured to collect a speech, and a controller configured to obtain speech input direction information about the speech and determine a content output direction based on the speech input direction information. Alternatively, a content reproducer according to the present disclosure includes a communicator configured to obtain speech input direction information, and a controller configured to determine a content output direction based on the speech input direction information.

8 Claims, 9 Drawing Sheets

(51) Int. Cl.

| | |
|---|---|
| *G10L 25/87* | (2013.01) |
| *G10L 13/02* | (2013.01) |
| *H04R 1/40* | (2006.01) |
| *H04R 3/00* | (2006.01) |
| *H04R 3/12* | (2006.01) |
| *H04R 5/04* | (2006.01) |
| *G10L 25/51* | (2013.01) |
| *G10L 13/00* | (2006.01) |
| *G06F 3/16* | (2006.01) |
| *G10L 15/00* | (2013.01) |
| *G01S 3/80* | (2006.01) |

(52) U.S. Cl.
CPC .............. *G10L 13/02* (2013.01); *G10L 15/00* (2013.01); *G10L 25/51* (2013.01); *H04R 1/403* (2013.01); *H04R 1/406* (2013.01); *H04R 3/00* (2013.01); *H04R 3/005* (2013.01); *H04R 3/12* (2013.01); *H04R 5/04* (2013.01)

(58) Field of Classification Search
CPC ......... G10L 15/00; G10L 25/51; G10L 25/87; H04R 1/403; H04R 1/406; H04R 2420/07; H04R 2430/23; H04R 3/00; H04R 3/005; H04R 3/12; H04R 5/04
USPC .......................... 704/200, 231, 246, 258, 275
See application file for complete search history.

(56) References Cited

U.S. PATENT DOCUMENTS

| | | | |
|---|---|---|---|
| 6,296,348 B1 | 10/2001 | Shibata | |
| 6,535,854 B2 | 3/2003 | Buchner et al. | |
| 7,509,178 B2 * | 3/2009 | Logan | G06Q 30/06 |
| | | | 700/94 |
| 8,340,975 B1 | 12/2012 | Rosenberger | |
| 8,749,489 B2 * | 6/2014 | Ito | A63F 13/26 |
| | | | 345/158 |
| 9,030,410 B2 * | 5/2015 | Shimohata | A63F 13/533 |
| | | | 345/156 |
| 9,179,214 B2 * | 11/2015 | Kishinami | H04R 1/32 |
| 9,466,295 B2 | 10/2016 | Zhang | |
| 9,489,939 B2 * | 11/2016 | Chiba | G10L 13/047 |
| 9,615,048 B2 * | 4/2017 | Ito | A63F 13/235 |
| 9,811,314 B2 | 11/2017 | Plagge | |
| 10,209,952 B2 * | 2/2019 | Tanaka | G06F 3/165 |
| 10,237,648 B2 * | 3/2019 | Takada | H04R 1/025 |
| 10,429,961 B2 * | 10/2019 | Shimohata | A63F 13/235 |
| 10,666,838 B2 * | 5/2020 | Tsukada | H04N 21/4325 |
| 10,817,249 B2 * | 10/2020 | Tanaka | H04S 7/302 |
| 2002/0069063 A1 | 6/2002 | Buchner | |
| 2003/0204566 A1 | 10/2003 | Dhupelia | |
| 2003/0217135 A1 | 11/2003 | Chatani | |
| 2005/0049862 A1 * | 3/2005 | Choi | G10L 17/00 |
| | | | 704/231 |
| 2006/0165242 A1 * | 7/2006 | Miki | H04R 3/02 |
| | | | 381/59 |
| 2006/0173958 A1 | 8/2006 | Chatani | |
| 2006/0190540 A1 | 8/2006 | Chatani | |
| 2007/0076729 A1 | 4/2007 | Takeda | |
| 2007/0265844 A1 | 11/2007 | Koyama | |
| 2008/0235024 A1 * | 9/2008 | Goldberg | G10L 13/00 |
| | | | 704/260 |
| 2008/0280686 A1 | 11/2008 | Dhupelia | |
| 2008/0285771 A1 | 11/2008 | Tanaka et al. | |
| 2009/0006545 A1 | 1/2009 | Dhupelia | |
| 2009/0006604 A1 | 1/2009 | Dhupelia | |
| 2009/0094370 A1 | 4/2009 | Jacob | |
| 2009/0113060 A1 | 4/2009 | Jacob | |
| 2009/0177303 A1 * | 7/2009 | Logan | H04N 21/4307 |
| | | | 700/94 |
| 2009/0198357 A1 * | 8/2009 | Logan | H04N 21/6582 |
| | | | 700/94 |
| 2010/0077087 A1 | 3/2010 | Roy | |
| 2010/0279767 A1 | 11/2010 | Dhupelia | |
| 2010/0285872 A1 | 11/2010 | Dhupelia | |
| 2010/0287239 A1 | 11/2010 | Chatani | |
| 2011/0054894 A1 | 3/2011 | Phillips | |
| 2011/0179180 A1 * | 7/2011 | Schleifer | H04L 12/1818 |
| | | | 709/227 |
| 2011/0184730 A1 | 7/2011 | LeBeau | |
| 2012/0166651 A1 | 6/2012 | Jacob | |
| 2013/0018658 A1 | 1/2013 | Agapi | |
| 2013/0089218 A1 * | 4/2013 | Kishinami | H04R 1/32 |
| | | | 381/92 |
| 2013/0089300 A1 | 4/2013 | Soundararajan | |
| 2013/0304931 A1 | 11/2013 | Jacob | |
| 2013/0314340 A1 * | 11/2013 | Shimohata | G06F 3/038 |
| | | | 345/173 |
| 2013/0314608 A1 * | 11/2013 | Ito | A63F 13/235 |
| | | | 348/734 |
| 2014/0078053 A1 * | 3/2014 | Shimohata | A63F 13/533 |
| | | | 345/156 |
| 2014/0100850 A1 | 4/2014 | Won | |
| 2014/0160361 A1 * | 6/2014 | Ito | A63F 13/235 |
| | | | 348/734 |
| 2014/0163707 A1 * | 6/2014 | Logan | G06F 16/4387 |
| | | | 700/94 |
| 2014/0180697 A1 | 6/2014 | Torok | |
| 2014/0188477 A1 | 7/2014 | Zhang | |
| 2014/0188478 A1 | 7/2014 | Zhang | |
| 2014/0256449 A1 | 9/2014 | Chatani | |
| 2015/0088521 A1 * | 3/2015 | Chiba | G06Q 10/107 |
| | | | 704/260 |
| 2015/0179175 A1 | 6/2015 | Torok | |
| 2015/0180958 A1 | 6/2015 | Jacob | |
| 2015/0205568 A1 | 7/2015 | Matsuoka | |
| 2015/0304413 A1 * | 10/2015 | Park | G06Q 50/01 |
| | | | 709/204 |
| 2016/0014506 A1 | 1/2016 | Tanaka et al. | |
| 2016/0125892 A1 | 5/2016 | Bowen | |
| 2018/0013802 A1 | 1/2018 | Chatani | |
| 2018/0013820 A1 | 1/2018 | Jacob | |
| 2018/0088898 A1 * | 3/2018 | Tanaka | G06F 3/165 |
| 2018/0181369 A1 * | 6/2018 | Tanaka | G06F 3/0482 |
| 2018/0182399 A1 | 6/2018 | Suyama | |
| 2018/0262657 A1 * | 9/2018 | Tsukada | G06F 3/167 |
| 2018/0295443 A1 * | 10/2018 | Takada | B60N 2/80 |
| 2018/0302716 A1 * | 10/2018 | Takasu | H04R 1/06 |
| 2019/0279658 A1 * | 9/2019 | Suyama | G10L 13/02 |

FOREIGN PATENT DOCUMENTS

| | | |
|---|---|---|
| JP | H01318444 A | 12/1989 |
| JP | H11311996 A | 11/1999 |
| JP | 2000099076 A | 4/2000 |
| JP | 2000157357 A | 6/2000 |
| JP | 2000211177 A | 8/2000 |
| JP | 2002315069 A | 10/2002 |
| JP | 2003195939 A | 7/2003 |
| JP | 2003330485 A | 11/2003 |
| JP | 2005078072 A | 3/2005 |
| JP | 2005531048 A | 10/2005 |
| JP | 2007151103 A | 6/2007 |
| JP | 200821366 A | 1/2008 |
| JP | 2008021366 A | 1/2008 |
| JP | 2011232521 A | 11/2011 |
| JP | 2014078007 A | 5/2014 |
| JP | 2016501391 A | 1/2016 |
| JP | 2016021650 A | 2/2016 |
| WO | 2005062293 A1 | 7/2005 |
| WO | 2014199596 A1 | 12/2014 |

OTHER PUBLICATIONS

Office Action issued in Japanese Appln. No. 2018-554275 dated Apr. 7, 2020. English machine translation provided.
International Search Report issued in International Application No. PCT/JP2017/043271 dated Feb. 20, 2018. English translation provided.

(56) References Cited

OTHER PUBLICATIONS

Written Opinion issued in International Application No. PCT/JP2017/043271 dated Feb. 20, 2018.
Office Action issued in Japanese Appln. No. 2018-554275 dated Jan. 14, 2020. English machine translation provided.
Office Action issued in U.S. Appl. No. 15/903,436 dated Mar. 16, 2020.
International Search Report issued in Intl. Appln. No PCT/JP2016/085976 dated Feb. 14, 2017 English translation provided.
Written Opinion issued in Intl. Appln. No. PCT/JP2016/085976 dated Feb. 14, 2017. English translation provided.
International Preliminary Report on Patentability issued in Intl. Appln. No. PCT/JP2016/085976 dated Jun. 13, 2019. English translation provided.
International Search Report issued in Intl. Appln. No. PCT/JP2016/085975 dated Mar. 7, 2017. English translation provided.
Written Opinion issued in Intl. Appln. No. PCT/JP2016/085975 dated Mar. 7, 2017. English translation provided.
International Preliminary Report on Patentability issued in Intl. Appln. No. PCT/JP2016/085975 dated Jun. 13, 2019. English translation provided.
International Search Report issued in Intl. Appln. No. PCT/JP2017/043269 dated Jan. 16, 2018. English translation provided.
Written Opinion issued in Intl. Appln. No. PCT/JP2017/043269 dated Jan. 16, 2018. English translation provided.
International Preliminary Report on Patentability issued in Intl. Appln. No. PCT/JP2017/043269 dated Jun. 13, 2019. English translation provided.
English translation of Written Opinion issued in Intl. Appln. No. PCT/JP2017/043271 dated Feb. 20, 2018, previously cited in IDS filed May 30, 2019.
International Preliminary Report on Patentability issued in Intl. Appln. No. PCT/JP2017/043271 dated Jun. 13, 2019. English translation provided.
Office Action issued in U.S. Appl. No. 15/903,436 dated Aug. 6, 2019.

* cited by examiner

CONTENT REPRODUCER, SOUND COLLECTOR, CONTENT REPRODUCTION SYSTEM, AND METHOD OF CONTROLLING CONTENT REPRODUCER

CROSS-REFERENCE TO RELATED APPLICATION

The present application is continuation of International Application No. PCT/JP2017/043271 filed on Dec. 1, 2017, which claims priority from Japanese Application No. JP 2016-235437 filed on Dec. 2, 2016. The contents of these applications are hereby incorporated by reference into this application.

BACKGROUND

1. Field

The present invention relates to a content reproducer, a sound collector, a content reproduction system and a method of controlling a content reproducer.

2. Description of the Related Art

In Patent Literature 1 (JP 2014-78007 A), there is disclosed a technology in which a speech recognition module recognizes a speech input from a microphone, and the speech recognized by the speech recognition module is used to assist in the execution of preset operation.

In a content reproducer of the related art, a speaker included in the content reproducer emits sound in, for example, a front direction of the speaker irrespective of a speech input direction in which a user's speech is input to a microphone, despite the fact that the speech input direction varies.

SUMMARY

The present disclosure has been made in view of the problem described above, and an object of the present disclosure is therefore to implement a configuration that gives a directivity based on a speech input direction from which a user's speech is input to the outputting of content in a content reproducer.

A content reproducer according to one embodiment of the present disclosure includes a sound collector configured to collect a speech, and a controller configured to obtain speech input direction information about the speech and determine a content output direction based on the speech input direction information. Alternatively, a content reproducer according to one embodiment of the present disclosure includes a communicator configured to obtain speech input direction information, and a controller configured to determine a content output direction based on the speech input direction information.

A sound collector according to one embodiment of the present disclosure includes: a sound collector configured to collect a speech; a controller configured to obtain speech input direction information based on the speech, and determine a content output direction based on the speech input direction information; and a communicator configured to transmit information about the content output direction.

A content reproduction system according to one embodiment of the present disclosure includes: a sound collector configured to obtain speech input direction information, and transmit the speech input direction information; and a content reproducer configured to receive the speech input direction information from the sound collector, and determine a content output direction based on the speech input direction information.

A content reproduction system according to one embodiment of the present disclosure includes: a sound collector configured to obtain speech input direction information, determine a content output direction based on the speech input direction information, and transmit information about the content output direction; and a content reproducer configured to receive the information about the content output direction, and determine a content output direction based on the information about the content output direction.

A method of controlling a content reproducer according to one embodiment of the present disclosure includes the steps of: obtaining speech input direction information about a speech; and determining a content output direction based on the speech input direction information.

DETAILED DESCRIPTION

First Embodiment

A first embodiment of the present disclosure is described below with reference to the drawings.

[Content Reproduction System 300]

Figure 1:
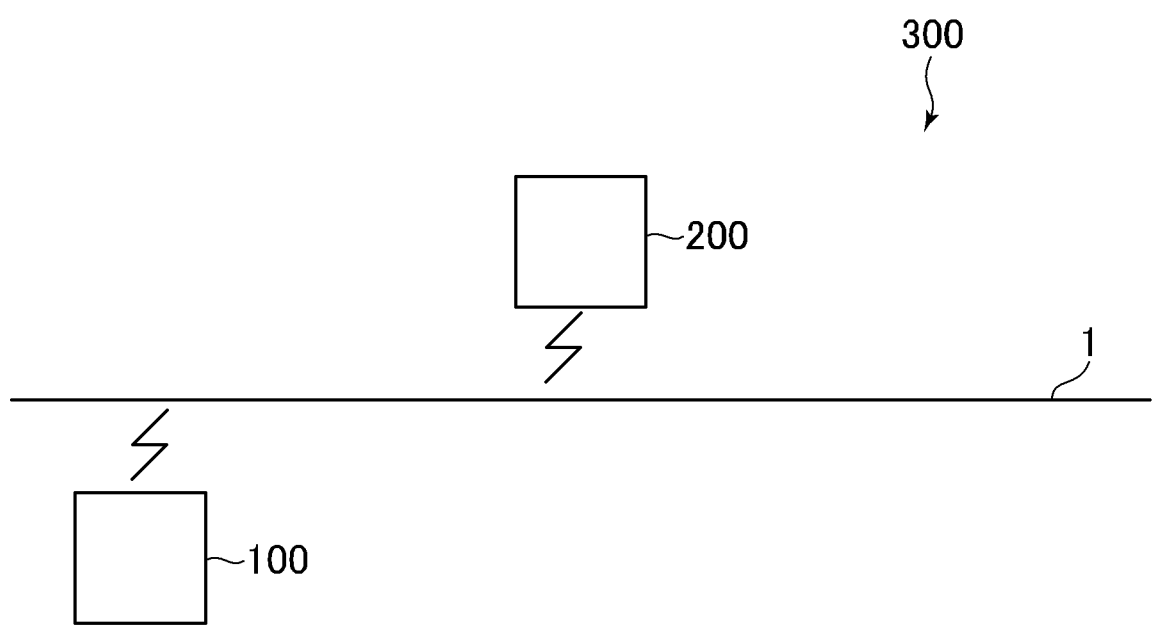
FIG. 1 is a diagram for illustrating the outline of a content reproduction system according to a first embodiment of the present disclosure.

FIG. 1 is a conceptual diagram of a content reproduction system 300 according to the first embodiment. The content reproduction system 300 in the first embodiment includes a server 200 and a content reproducer 100. The content reproducer 100 is connected to the server 200 via a network 1. The term "content" in the present disclosure includes, for example, audio and video.

[Network 1]

The network 1 includes a wireless local area network (LAN), a wired LAN, a wide area network (WAN), an infrared communication network, a radio wave network, a Bluetooth (a trademark) network, or the like, and is used as a signal transmission path between the content reproducer 100 and the server 200.

[Server 200]

The server 200 receives speech information from the content reproducer 100, which is described later, over the network 1. The server 200 creates a command signal based on the received speech information, and transmits the command signal over the network 1 to the content reproducer 100. The server 200 in the first embodiment includes a cloud server premised to be used on the Internet network.

[Content Reproducer 100]

Figure 2:
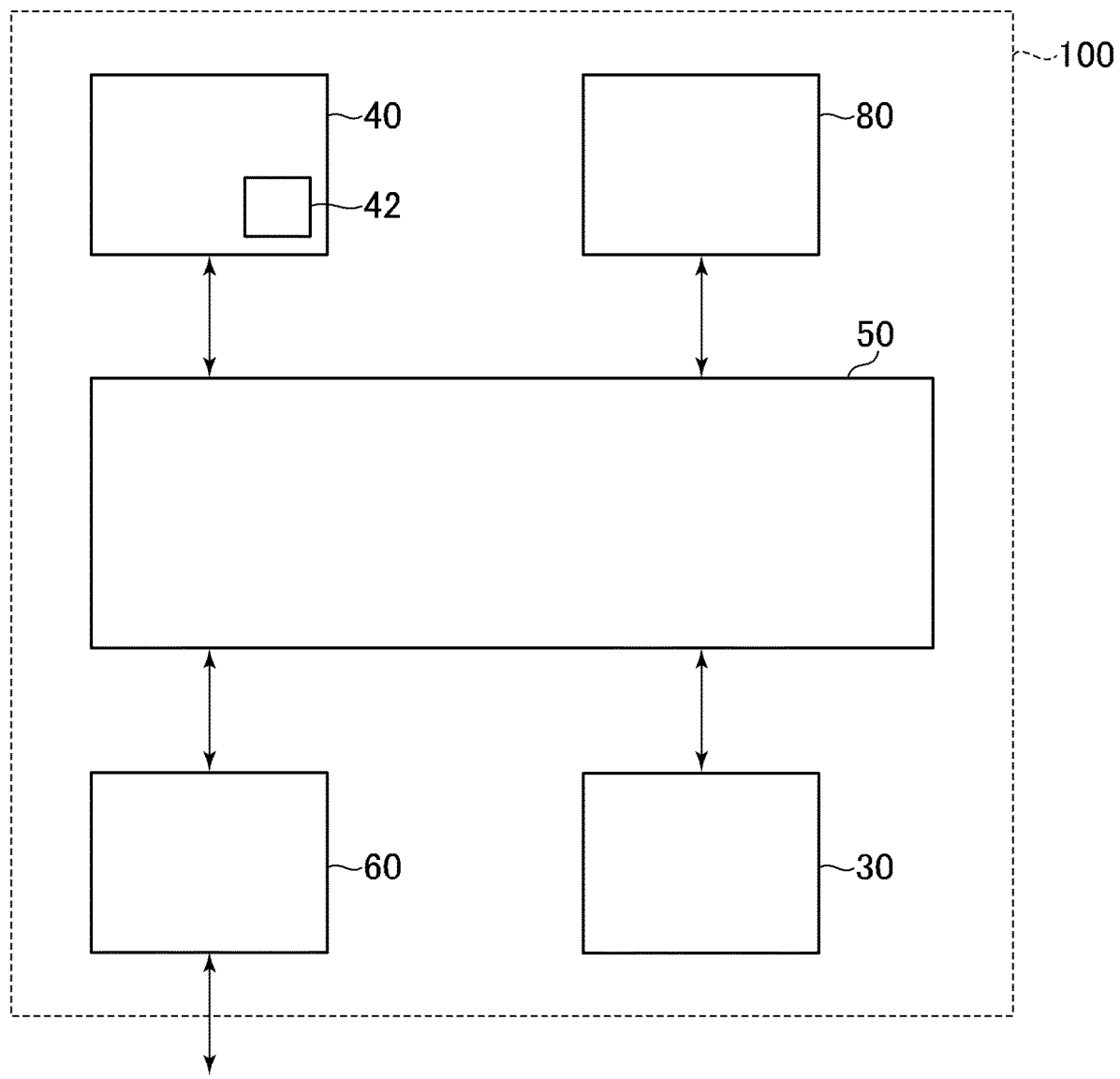
FIG. 2 is a block diagram of a content reproducer according to the first embodiment.

FIG. 2 is a block diagram of the content reproducer 100 according to the first embodiment. The content reproducer 100 in the first embodiment is a device on which content, for example, music or video, is to be reproduced, and is a sound projector or a similar device capable of outputting the content in a specific direction. The content reproducer 100 includes, among others, a sound collector 30, a storage unit 40, a controller 50, a communicator 60, and a content outputter 80. The content reproducer 100 is a computer configured to execute a speech input direction information obtaining step S1, a transmission step S2, a command signal generation step S3, a command signal transmission step S4, a command signal reception step S5, and a content output direction determination step S6, which are described later, as well as other operations, based on a program 42 stored in the storage unit 40. The program 42 may be installed from various recording media, regardless of whether the medium is optical, magnetic, or of other types, and may also be downloaded over the Internet.

[Sound Collector 30]

The sound collector 30 is, for example, a plurality of microphones built in the content reproducer 100. The sound collector 30 collects a speech uttered by a user, and also transmits information about the speech to the controller 50.

[Storage Unit 40]

The storage unit 40 is implemented as, for example, a hard disk drive (HDD). Various recording media including flash memories and other solid memories, memory cards with a built-in solid memory, optical discs, magneto-optical disks, and hologram memories may be employed by the storage unit 40, and the storage unit 40 is configured so that the recording and reproduction of the employed recording medium are executable. The program 42 to be used by the controller 50 is stored in the storage unit 40.

[Controller 50]

The controller 50 includes a CPU and a memory. The controller 50 uses the program 42 stored in the storage unit 40 to control the operation of the sound collector 30, the storage unit 40, the communicator 60, and the content outputter 80.

The controller 50 obtains speech input direction information based on the user's speech information received from the sound collector 30. The speech input direction information is information about a direction in which a speech uttered by a user is input to the sound collector 30. The speech input direction information may be obtained by, for example, a method in which differences in speech arrival time among the plurality of microphones are detected, or a method in which scanning is performed with the use of a beam having acute directivity. In the first embodiment, the sound collector 30 includes a plurality of microphones arranged in a lateral direction, and a method in which the controller 50 detects differences in speech arrival time among the plurality of microphones is employed to obtain the speech input direction information. The controller that controls the operation of the sound collector 30, the storage unit 40, the communicator 60, and the content outputter 80 and the controller that obtains the speech input direction information may be unitary or may be separate units. In the case of separate controllers, the controller that obtains the speech input direction information obtains the speech input direction information based on the user's speech information received from the sound collector 30, and transmits the speech input direction information to the controller for operation control.

The controller 50 transmits the user's speech obtained from the sound collector 30 to the server 200 over the network 1. The controller 50 keeps the user's speech in the sound format when transmitting the speech to the server 200, to thereby enable an existing internet server that conducts speech recognition to be used as the server 200. The controller 50 may be configured so that a synthetic speech converted from the speech input direction information is transmitted to the server 200 along with the user's speech.

The controller 50 receives, via the communicator 60, a command signal created and transmitted by the server 200. The controller 50 determines the specifics of operation to be executed, such as reproducing content or controlling the volume, based on the received command signal. When content is to be reproduced, the controller 50 determines the content output direction based on the speech input direction information described above.

[Communicator 60]

The communicator 60 is compatible with a wireless LAN, a wired LAN, a WAN, an infrared communication network, a radio wave network, a Bluetooth (a trademark) network, or the like, and holds signal communication to and from the server 200 over the network 1.

[Content Outputter 80]

The content outputter 80 includes, among others, a plurality of speakers and a display device, and outputs content, for example, audio or video, in response to a command from the controller 50.

In the first embodiment, the content outputter 80 includes a plurality of small-diameter speakers arranged in a lateral direction, and the output timing of the speakers is finely controlled to cause the speakers to output audio at, for example, the same timing or staggered timing. The fine control enables the content outputter 80 to output audio in a specific direction. The output timing may be controlled by the controller 50, or by a controller for output timing control included in the content outputter 80.

[Operation Example of the Content Reproduction System 300]

Figure 3:
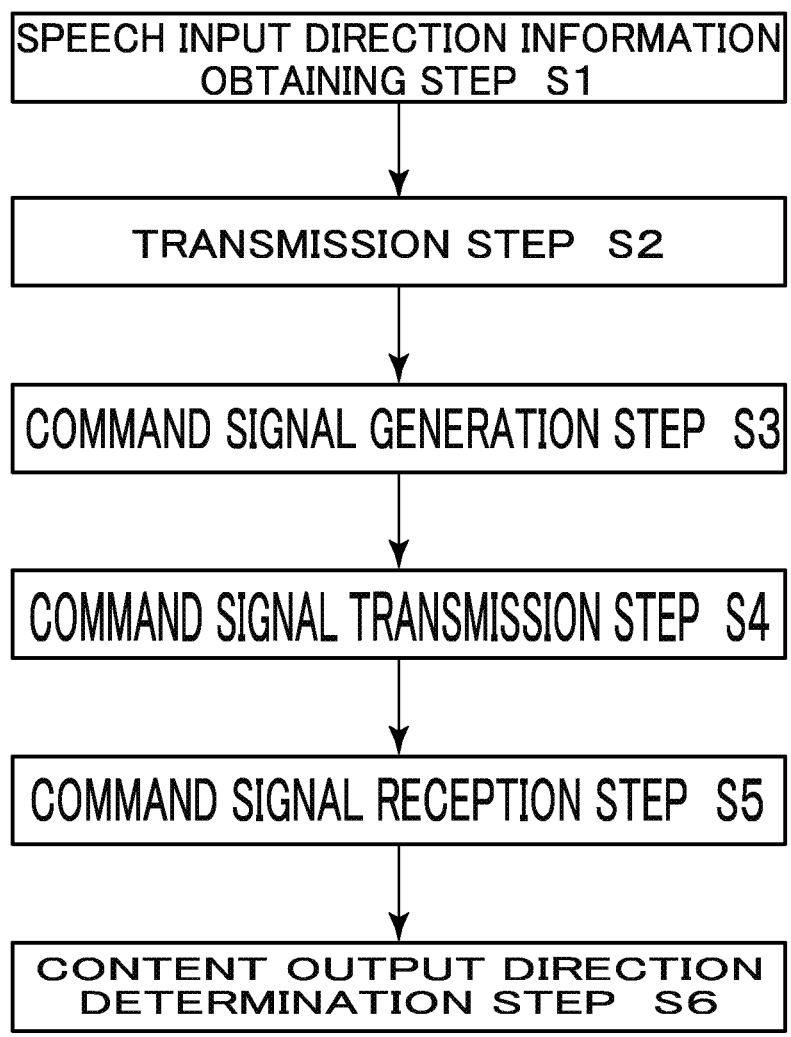
FIG. 3 is a flow chart for illustrating an operation example of the content reproduction system according to the first embodiment.

An operation example of the content reproduction system 300 according to the first embodiment is described next with reference to FIG. 3. FIG. 3 is a flow chart for illustrating an operation example of the content reproduction system 300 in the first embodiment.

[Speech Input Direction Information Obtaining Step S1]

The sound collector 30 and the controller 50 of the content reproducer 100 execute a speech input direction information obtaining step S1, in which the speech input direction information is obtained from a speech uttered by the user.

A case in which the user utters a speech "reproduce Content A" at a position angled at 45 degrees to a front direction of the sound collector 30 is described in the first embodiment.

The sound collector 30 collects "reproduce Content A", which is a speech uttered by the user, and transmits the speech to the controller 50. The controller 50 receives the speech and, by the detection of differences in speech arrival time among the plurality of microphones described above, recognizes that the position at which the user has uttered the speech is angled at 45 degrees to the front direction of the sound collector 30. That is, the controller 50 obtains speech input direction information indicating that "the user has uttered the speech at a position angled at 45 degrees to the front direction of the sound collector 30".

[Transmission Step S2]

The controller 50 of the content reproducer 100 transmits the speech uttered by the user to the server 200 over the network 1.

In the first embodiment, the controller 50 transmits "reproduce Content A", which is a speech uttered by the user, to the server 200.

[Command Signal Generation Step S3]

The server 200 generates a command signal from the speech uttered by the user and received from the controller 50 over the network 1.

In the first embodiment, the server 200 generates a command signal that requests the reproduction of Content A.

[Command Signal Transmission Step S4]

The server 200 transmits the command signal generated in the command signal generation step S3 to the content reproducer 100.

In the first embodiment, the server 200 transmits to the content reproducer 100 a command signal that requests the reproduction of Content A.

[Command Signal Reception Step S5]

The controller 50 of the content reproducer 100 receives the command signal transmitted from the server 200 over the network 1.

In the first embodiment, the controller 50 receives the command signal that requests the reproduction of Content A.

[Content Output Direction Determination Step S6]

The controller 50 of the content reproducer 100 determines a content output direction based on the speech input direction information obtained in the speech input direction information obtaining step S1.

In the first embodiment, the controller 50 determines a direction in which the content is to be output based on the speech input direction information indicating that "the angle is 45 degrees to the right". The controller 50 then reproduces Content A based on the command signal that is received from the server 200 and that requests the reproduction of Content A, and also issues an instruction to output Content A in the determined output direction to the content outputter 80. In an alternative configuration, the controller 50 may transmit a synthetic speech converted from the speech input direction information to the server 200 in addition to the speech uttered by the user in the transmission step S2 described above, and receive a command signal containing the speech input direction information from the server 200 to determine the content output direction.

While the first embodiment gives a description on an example in which the content reproduction system 300 includes the server 200, and the content reproducer 100 and the server 200 exchange a user's speech, a command signal, and others to reproduce content, the content reproduction system 300 may have a configuration in which the server 200 is omitted. Specifically, when the content reproducer 100 is capable of generating a command signal from a recognized speech, the content reproduction system 300 may have a configuration in which the sound collector 30 of the content reproducer 100 collects a speech uttered by the user, the controller 50 recognizes the speech and generates a command signal, and content is reproduced based on the command signal.

The content reproduction system 300 may also have a configuration in which the controller 50 performs speaker recognition on the user's speech in the speech input direction information obtaining step S1 so that the speech input direction information is obtained only in response to a speech of a specific user. This configuration enables the content reproducer 100 to determine the content output direction based on the speech input direction information of a specific user even when speeches of a plurality of users are input to the sound collector 30.

The content reproducer 100 in the example described in the first embodiment outputs content toward the speech input direction, namely, the direction of the user, based on the speech input direction information. The content reproducer 100 may be configured so that content is output in a direction opposite from the speech input direction, or a direction that forms a given angle to the speech input direction.

Second Embodiment

A second embodiment of the present disclosure is described below with reference to the drawings. In the second embodiment, components common to the first embodiment are denoted by the same reference symbols, and descriptions thereof may be omitted.

[Content Reproduction System 300B]

Figure 4:
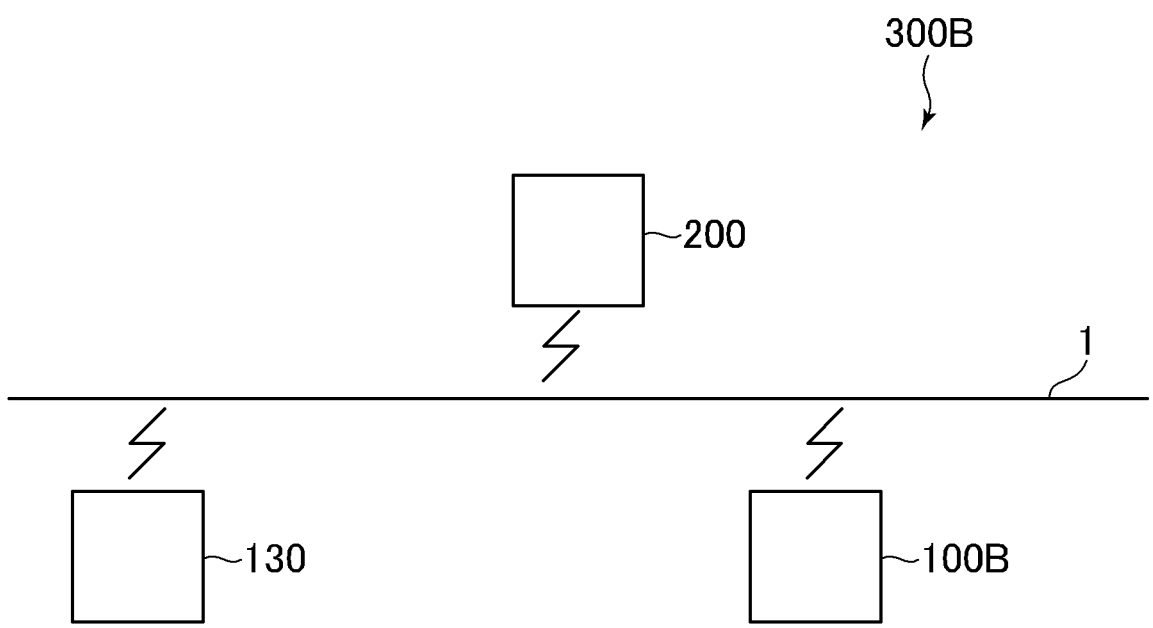
FIG. 4 is a diagram for illustrating the outline of a content reproduction system according to a second embodiment of the present disclosure.

FIG. 4 is a conceptual diagram of a content reproduction system 300B according to the second embodiment. The content reproduction system 300B in the second embodiment includes the server 200, a sound collector 130, and a content reproducer 100B. The content reproducer 100B, the sound collector 130, and the server 200 are connected to one another via a network 1. The term "content" in the present disclosure includes, for example, audio and video.

The network 1 and the server 200 have the same configurations as those in the first embodiment, and descriptions on the configurations are therefore omitted here.

[Sound Collector 130]

Figure 9:
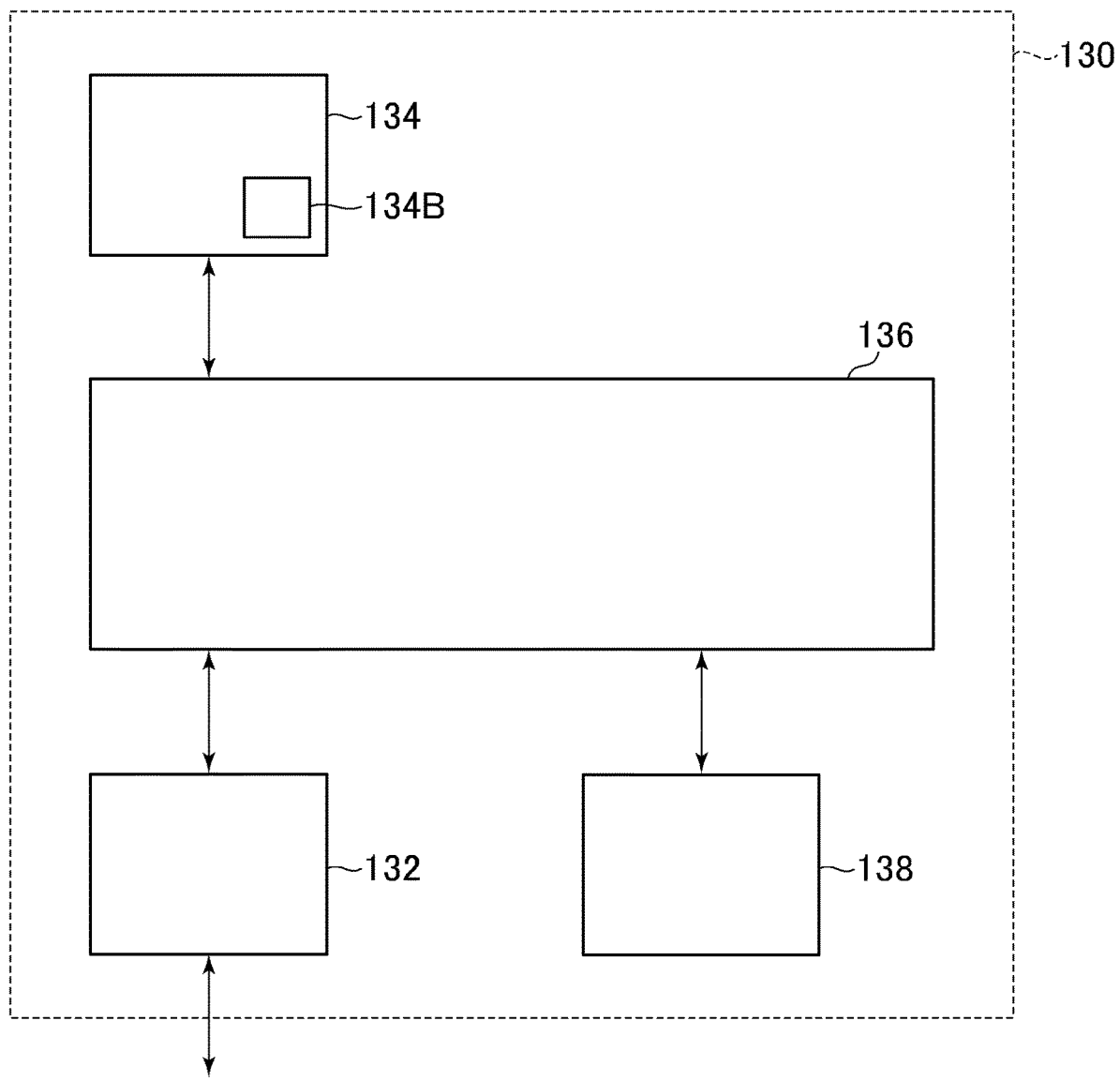
FIG. 9 is a block diagram of a sound collector according to the second embodiment.

FIG. 9 is a block diagram of the sound collector 130 according to the second embodiment. The sound collector 130 includes, among others, a communicator 132, a storage unit 134, a controller 136, and a sound collector 138, and is a computer configured to execute an information obtaining step S201, a conversion-to-first-synthetic speech step S202, and a transmission step S203, which are described later, as well as other operations, based on a program 134B stored in the storage unit 134. The program 134B may be installed from various recording media, regardless of whether the medium is optical, magnetic, or of other types, and may also be downloaded over the Internet. The communicator 132 of the sound collector 130 is compatible with a wireless LAN, a wired LAN, a WAN, an infrared communication network, a radio wave network, a Bluetooth (a trademark) network, or the like, and holds signal communication to and from the server 200 and the content reproducer 100B over the network 1.

The sound collector 138 included in the sound collector 130 includes a plurality of microphones to collect a speech uttered by a user, and also transmits the speech to the controller 136. The controller 136 receives the user's speech and, by the detection of differences in speech arrival time among the plurality of microphones described above, obtains speech input direction information from the speech. The speech input direction information is information about a direction in which the speech uttered by the user is input to the sound collector 130.

The controller 136 of the sound collector 130 in the second embodiment further obtains, from the speech, distance-to-user information. The distance-to-user information is information about a distance between the sound collector 130 and the user.

The controller 136 of the sound collector 130 converts the speech input direction information into a first synthetic speech. The first synthetic speech is a synthetic speech that is related to the input direction of a speech uttered by the user. For example, when the user's speech is input from an angle of 45 degrees to the sound collector 130, the sound collector 130 converts the speech input direction information into a first synthetic speech saying "the angle is 45 degrees".

The sound collector 130 in the second embodiment includes the distance-to-user information in the first synthetic speech as well. For example, when the user utters a speech at a distance of 3 m from the sound collector 130, the sound collector 130 converts the speech input direction information and the distance-to-user information into a first synthetic speech saying "the angle is 45 degrees and the distance is 3 m". The distance-to-user information may be an estimation obtained by, for example, collecting a speech of the user from a given distance in advance and comparing the spectrum of the previously speech collected and the spectrum of a currently collected speech. It is estimated that the user is farther than the distance in the advance sound collection when low-frequency sound waves whose attenuation rates decrease as the distance grows longer are increased in proportion. Conversely, it is estimated that the user is closer than the distance in the advance sound collection when the proportion of high-frequency sound waves is increased.

The communicator 132 of the sound collector 130 transmits the user's speech to the server 200 over the network 1. In the transmission, the sound collector 130 transmits a single piece of audio data that is obtained by adding the first synthetic speech described above to the user's speech.

[Content Reproducer 100B]

Figure 5:
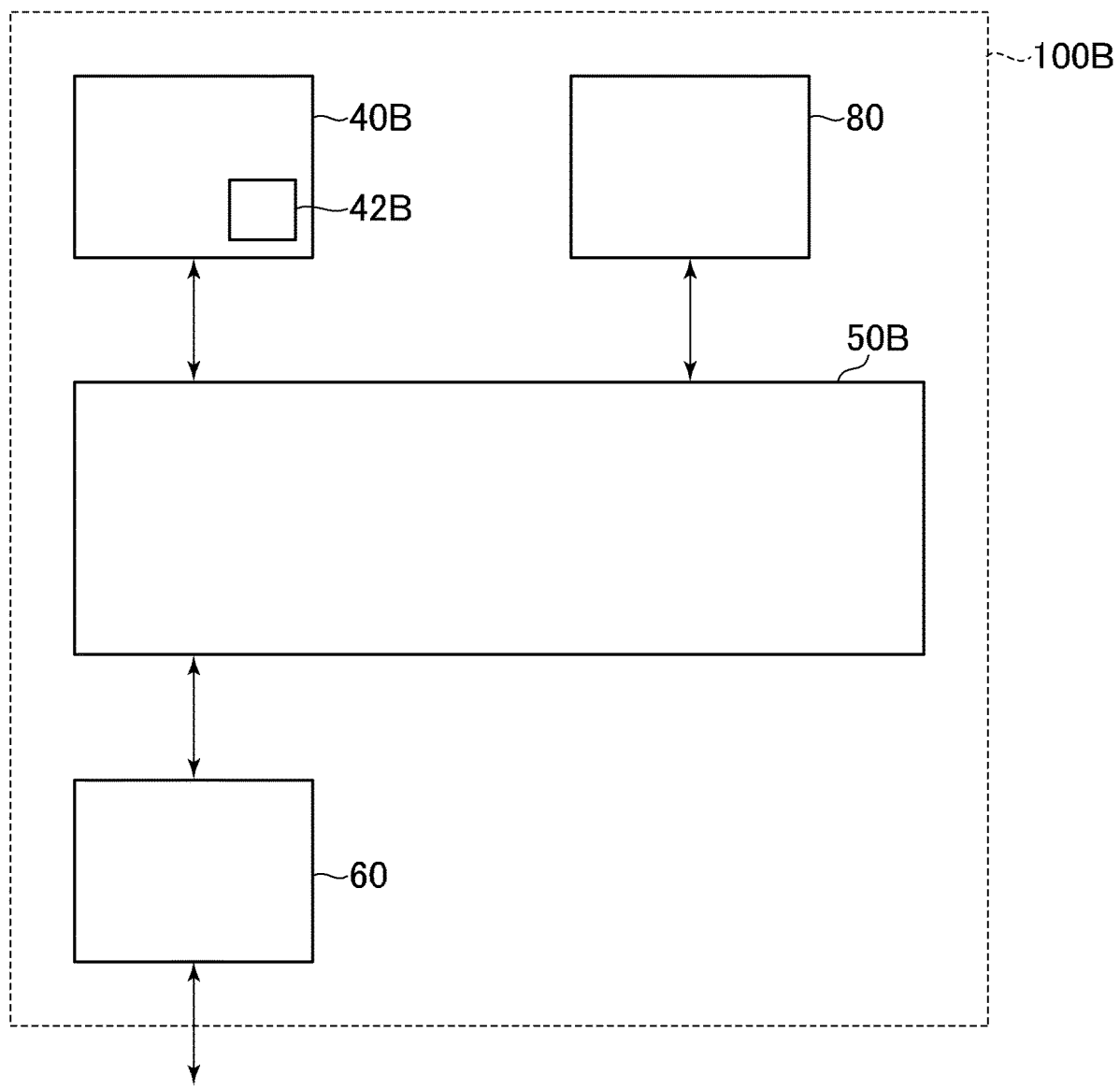
FIG. 5 is a block diagram of a content reproducer according to the second embodiment.

FIG. 5 is a block diagram of the content reproducer 100B according to the second embodiment. The content reproducer 100B in the second embodiment is a device on which content, for example, music or video, is reproduced, and is a sound projector or a similar device capable of outputting the content in a specific direction. The content reproducer 100B includes, among others, a storage unit 40B, a controller 50B, the communicator 60, and the content outputter 80. The content reproducer 100B is a computer configured to execute an information obtaining step S201, a conversion-to-first-synthetic-speech step S202, a transmission step S203, a command signal generation step S204, a command signal transmission step S205, a command signal reception step S206, a content output direction determination step S207, an origin adjustment step S208, and an axis adjustment step S209, which are described later, as well as other operations, based on a program 42B stored in the storage unit 40B. The program 42B may be installed from various recording media, regardless of whether the medium is optical, magnetic, or of other types, and may also be downloaded over the Internet.

The communicator 60 and the content outputter 80 have configurations common to those in the first embodiment, and descriptions on the configurations are therefore omitted here. However, the communicator 60 in the second embodiment differs from the one in the first embodiment in that the speech input direction information is obtained from the sound collector 130 via the network 1.

[Storage Unit 40B]

The storage unit 40B has the same configuration as that of the storage unit 40 in the first embodiment described above, except that the program 42B to be used by the controller 50B, which is described later, is stored. A description on the storage unit 40B is therefore omitted here.

[Controller 50B]

The controller 50B includes a CPU and a memory. The controller 50B uses the program 42B stored in the storage unit 40B to control the operation of the storage unit 40B and the communicator 60.

The controller 50B receives a command signal transmitted from the server 200 via the communicator 60. The command signal contains command information recognized by the server 200 based on the user's speech, the speech input direction information recognized by the server 200 based on the first synthetic speech, and the distance-to-user information. The controller 50B determines the specifics of operation to be executed, such as reproducing content or controlling the volume, based on the command information contained in the received command signal. The controller 50B also determines the content output direction based on the speech input direction information contained in the received command signal.

[Operation Example of the Content Reproduction System 300B]

Figure 6:
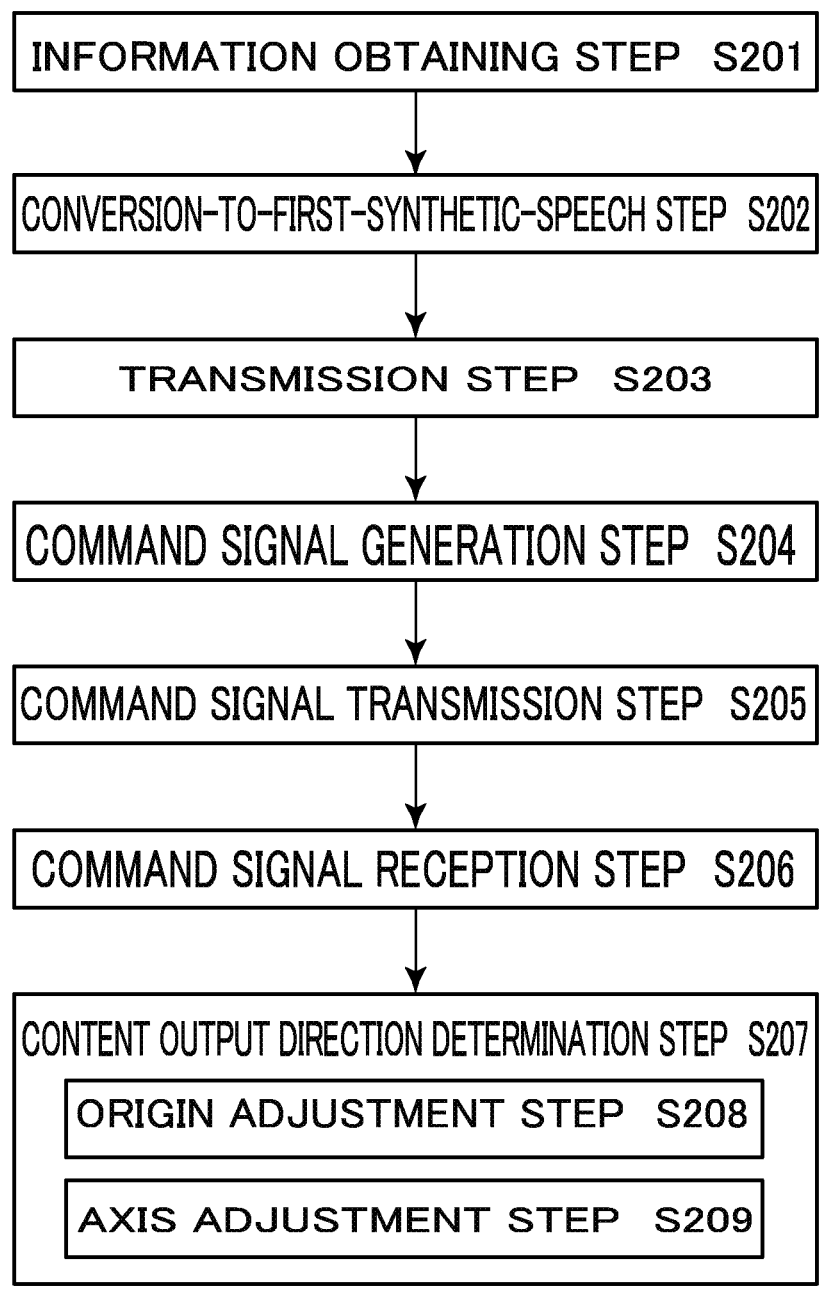
FIG. 6 is a flowchart for illustrating an operation example of the content reproduction system according to the second embodiment.

An operation example of the content reproduction system 300B according to the second embodiment is described next with reference to FIG. 6. FIG. 6 is a flow chart for illustrating an operation example of the content reproduction system 300B in the second embodiment.

[Information Obtaining Step S201]

The sound collector 130 executes an information obtaining step S201, in which the speech input direction information and the distance-to-user information are obtained from a speech uttered by the user.

A case in which the user utters a speech "reproduce Content A" at a position angled at 45 degrees to a front direction of the sound collector 130 and distanced from the sound collector 130 by 3 m is described in the second embodiment.

The sound collector 130 collects "reproduce Content A", which is a speech uttered by the user, and also recognizes that the position at which the user has uttered the speech is angled at 45 degrees to the front direction of the sound collector 130. That is, the sound collector 130 obtains speech input direction information indicating that "the user has uttered the speech at a position angled at 45 degrees to the front direction of the sound collector 130".

The sound collector 130 in the second embodiment further recognizes that the position at which the user has uttered the speech is distanced from the sound collector 130 by 3 m. That is, the sound collector 130 obtains distance-to-user information indicating that "the user has uttered the speech at a position distanced from the sound collector 130 by 3 m".

[Conversion-to-First-Synthetic-Speech Step S202]

The sound collector 130 converts the obtained speech input direction information and distance-to-user information into a first synthetic speech. The first synthetic speech contains the speech input direction information and the distance-to-user information, and is generated as an audio signal recognizable to the server 200.

In the second embodiment, the sound collector 130 converts the speech input direction information and the distance-to-user information that are obtained in the information obtaining step S201 described above into a first synthetic speech saying "the angle is 45 degrees to the right and the distance is 3 m". With the speech input direction information and the distance-to-user information transmitted as audio data to the server 200 from the sound collector 130, an existing internet server that conducts speech recognition can be used as the server 200.

[Transmission Step S203]

The sound collector 130 transmits the speech uttered by the user and the first synthetic speech to the server 200 over the network 1.

In the second embodiment, the sound collector 130 transmits "reproduce Content A", which is a speech uttered by the user, and "the angle is 45 degrees to the right and the distance is 3 m", which is the first synthetic speech, as a single piece of audio data to the server 200. When "reproduce Content A", which is a speech uttered by the user, is followed by a few soundless seconds, for example, the soundless seconds are moved to the head of the audio data, to thereby be able to avoid leaving the few soundless seconds between the speech uttered by the user and the first synthetic speech, and transmit the speech uttered by the user and the first synthetic speech as one piece of audio data.

[Command Signal Generation Step S204]

The server 200 generates a command signal from the speech uttered by the user and the first synthetic speech, which are received from the sound collector 130 over the network 1.

In the second embodiment, the server 200 obtains a content source related to Content A and, based on the content source, generates a command signal containing operation instruction information that is an instruction to reproduce Content A, and the speech input direction information and the distance-to-user information that are contained in the first synthetic speech.

[Command Signal Transmission Step S205]

The server 200 transmits the command signal generated in the command signal generation step S4 to the content reproducer 100.

In the second embodiment, the server 200 transmits the content source related to Content A to the content reproducer 100B, and also transmits to the content reproducer 100B the command signal containing the operation instruction information that is an instruction to reproduce Content A, the speech input direction information that means "the angle is 45 degrees to the right", and the distance-to-user information that means "the distance is 3 m".

[Command Signal Reception Step S206]

The controller 50B of the content reproducer 100B receives the command signal transmitted from the server 200 over the network 1.

In the second embodiment, the controller 50B receives the content resource of Content A, and also receives the command signal containing the operation instruction information that is an instruction to reproduce Content A, the speech input direction information, and the distance-to-user information.

[Content Output Direction Determination Step S207]

The controller 50B of the content reproducer 100B determines the content output direction based on the speech input direction information and the distance-to-user information that are contained in the received command signal.

In the second embodiment, the sound collector 130 and the content reproducer 100B are separate devices, and thus the content output direction determination step S207 includes the origin adjustment step S208 for adjusting the misalignment between the origin position of the sound collector 130 and the origin position of the content reproducer 100B, and the axis adjustment step S209 for adjusting misalignment between the axial direction of the sound collector 130 and the axial direction of the content reproducer 100B.

When the sound collector 130 and the content reproducer 100B are placed at positions that are substantially the same and are not misaligned in the axial direction as well, the sound collector 130 may determine the content output direction without executing the origin adjustment step S208 and axis adjustment step S209 described later. The controller 50B in this case may be configured so that the distance-to-user information is not received.

[Origin Adjustment Step S208]

When the origin position of the sound collector 130 and the origin position of the content reproducer 100B are misaligned, the origin adjustment step S208 for adjusting the misalignment between the origin positions is executed. The origin adjustment step S208 may be executed by the content reproducer 100B or the sound collector 130. An example in which the content reproducer 100B executes the origin adjustment step S208 is described in the second embodiment.

Figure 7:
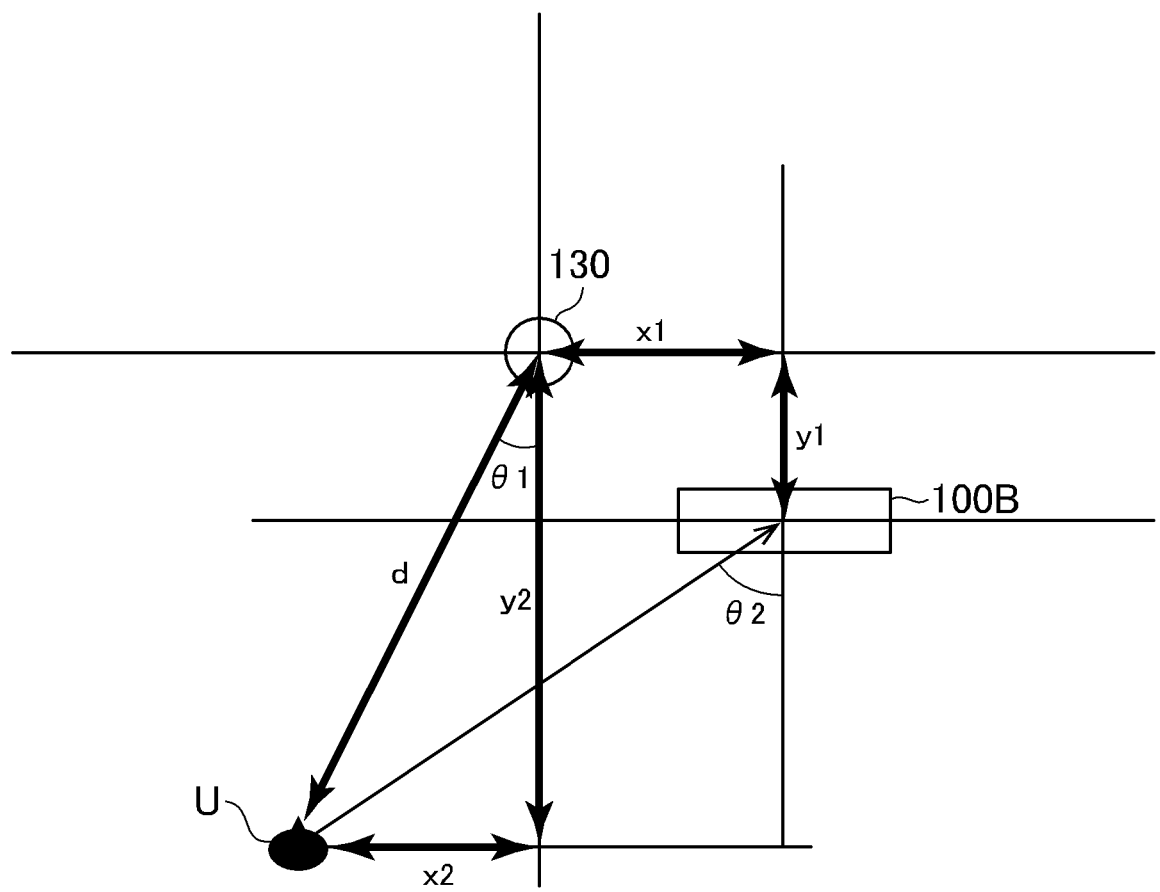
FIG. 7 is a conceptual diagram for illustrating an origin adjustment step in the second embodiment.

FIG. 7 is a conceptual diagram of the content reproduction system 300B in which the origin position of the sound collector 130 and the origin position of the content reproducer 100B are misaligned. As illustrated in FIG. 7, the content reproducer 100B is positioned so that the distance from the user to the content reproducer 100B in an X-axis direction is longer by a distance x1 than the distance from the user to the sound collector 130 in the X-axis direction. The content reproducer 100B is also positioned so that, as illustrated in FIG. 7, the distance from the user to the content reproducer 100B in a Y-axis direction is shorter by a distance y1 than the distance from the user to the sound collector 130 in the Y-axis direction. This origin position misalignment information is stored in the storage unit 40B of the content reproducer 100B.

The controller 50B of the content reproducer 100B calculates a distance x2 between the user and the sound collector 130 in the X-axis direction and a distance y2 between the user and the sound collector 130 in the Y-axis direction from the speech input direction information and the distance-to-user information that are contained in the received command signal. When the speech input direction is represented by θ1 and the distance between the user and the sound collector 130 is represented by d, the distance x2 and the distance y2 are expressed by mathematical expressions given below.

$$x2 = d \times \sin(\theta 1) \qquad \text{[Expression 1]}$$

$$y2 = d \times \cos(\theta 1) \qquad \text{[Expression 2]}$$

The controller 50B of the content reproducer 100B uses the origin position misalignment information of the content reproducer 100B and the sound collector 130 stored in the storage unit 40B and an expression given below to determine the content output direction.

$$\theta 2 = \arctan((y2-y1)/(x2+x1)) \qquad \text{[Expression 3]}$$

The content reproducer 100B then reproduces content based on the received content source, and outputs the content from the content outputter 80 in the determined output direction θ2.

When the content reproducer 100B is positioned closer to the user in the X-axis direction than the sound collector 130 is, a negative value is substituted in x1 in the expression given above. When the content reproducer 100B is positioned farther from the user in the Y-axis direction than the sound collector 130 is, a negative value is substituted in y1 in the expression given above.

The second embodiment gives an example in which the sound collector 130 transmits the speech input direction information and the distance-to-user information, and the content reproducer 100B receiving the speech input direction information and the distance-to-user information calculates the content output direction θ2 with the use of the origin position misalignment information stored in advance. The content reproduction system 300B, however, may have a configuration in which the sound collector 130 stores the origin position misalignment information and transmits the origin position misalignment information to the content reproducer 100B, and the content reproducer 100B calculates the content output direction θ2 with the use of the origin position misalignment information. Alternatively, the content reproduction system 300B may have a configuration in which the sound collector 130 stores the origin position misalignment information, calculates the content output direction θ2 with the use of the speech input direction information and the distance-to-user information, and transmits the calculated content output direction θ2 directly or indirectly to the content reproducer 100B. When the sound collector 130 is to transmit the content output direction θ2 via the server 200, the content output direction θ2 is converted into the first synthetic speech to be transmitted, instead of converting the speech input direction information and the distance-to-user information into the first synthetic speech. For instance, when the content output direction θ2 is calculated as 45 degrees to the right by the sound collector 130 with the use of the speech input direction information and the distance-to-user information, the content output direction θ2 is converted into a first synthetic speech saying "the angle is 45 degrees to the right". The sound collector 130 then transmits the speech "reproduce Content A" uttered by the user, followed by "the angle is 45 degrees to the right", which is the first synthetic speech, to the server 200. When the sound collector 130 is to transmit the content output direction θ2 directly to the content reproducer 100B, the content output direction θ2 is transmitted directly without being converted into the first synthetic speech.

[Axis Adjustment Step S209]

When the axial direction of the sound collector 130 and the axial direction of the content reproducer 100B are misaligned, the axis adjustment step S209 for adjusting the axial misalignment is executed. The axis adjustment step S209 may be executed by the content reproducer 100B or the sound collector 130. An example in which the content reproducer 100B executes the axis adjustment step S209 is described in the second embodiment.

Figure 8:
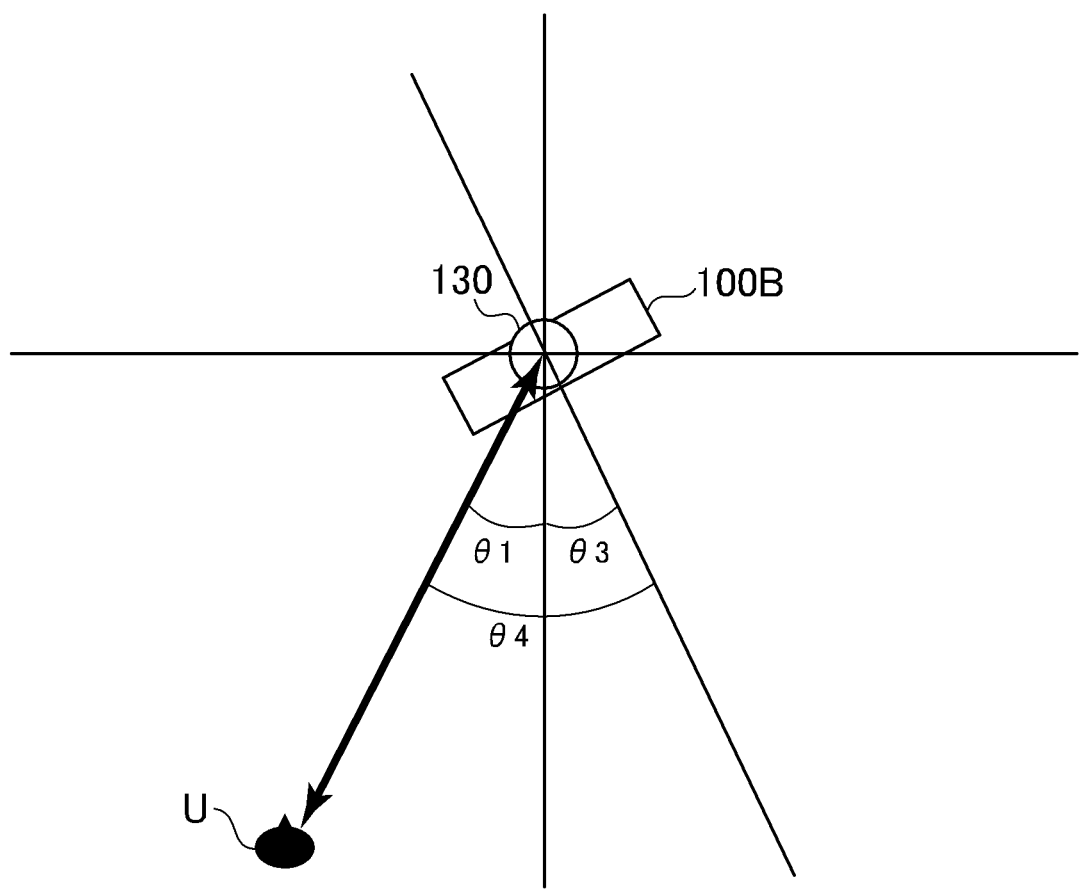
FIG. 8 is a conceptual diagram for illustrating an axis adjustment step in the second embodiment.

FIG. 8 is a conceptual diagram of the content reproduction system 300B in which the axial direction of the sound collector 130 and the axial direction of the content reproducer 100B are misaligned. As illustrated in FIG. 8, the front direction of the content reproducer 100B is farther from the user than the front direction of the sound collector 130 is by an angle θ3. This axial misalignment information is stored in the storage unit 40B of the content reproducer 100B.

The controller 50B of the content reproducer 100B calculates a content output direction θ4 from the speech input direction 81 contained in the received command signal with the use of a mathematical expression given below.

$$\theta 4 = \theta 1 + \theta 3 \qquad \text{[Expression 4]}$$

The content reproducer 100B then reproduces content based on the received content source, and outputs the content from the content outputter 80 in the determined output direction θ4.

When the front direction of the content reproducer 100B is closer to the user than the front direction of the sound collector 130 is, a negative value is substituted in θ3 in the expression given above.

When the origin position of the sound collector 130 and the origin position of the content reproducer 100B are misaligned, and the axial direction of the sound collector 130 and the axial direction of the content reproducer 100B are misaligned, both of the origin adjustment step S208 and the axis adjustment step S209 described above are executed. For example, the content output direction θ2 is calculated after an adjustment of the origin positions, and then the angle θ3, which represents axial misalignment, is added to θ2 to calculate the ultimate content output direction θ4.

The second embodiment gives an example in which the sound collector 130 transmits the speech input direction information, and the content reproducer 100B receiving the speech input direction information calculates the content output direction θ4 with the use of the axial misalignment information (and the origin position misalignment information) stored in advance. The content reproduction system 300B, however, may have a configuration in which the sound collector 130 stores the axial misalignment information (and the origin position misalignment information) and transmits the axial misalignment information and the origin position misalignment information to the content reproducer 100B, and the content reproducer 100B calculates the content output direction θ4 with the use of the axial misalignment information and the origin position misalignment information. Alternatively, the content reproduction system 300B may have a configuration in which the sound collector 130 stores the axial misalignment information (and the origin position misalignment information), calculates the content output direction θ4 with the use of the speech input direction information (and the distance-to-user information), and transmits information about the calculated content output direction θ4 directly or indirectly to the content reproducer 100B. When the sound collector 130 is to transmit the information about the content output direction θ4 via the server 200, the information about the content output direction θ4 is converted into the first synthetic speech to be transmitted, instead of converting the speech input direction information (and the distance-to-user information) into the first synthetic speech. For instance, when the content output direction θ4 is calculated as 45 degrees to the right by the sound collector 130, the content output direction θ4 is converted into a first synthetic speech saying "the angle is 45 degrees to the right". The sound collector 130 then transmits the speech "reproduce Content A" uttered by the user, followed by "the angle is 45 degrees to the right", which is the first synthetic speech, to the server 200. When the sound collector 130 is to transmit information about the content output direction θ4 directly to the content reproducer 100B, the information about the content output direction θ4 is transmitted directly without conversion to the first synthetic speech. With the information about the content output direction θ4 transmitted as audio data to the server 200 from the sound collector 130, an existing internet server that conducts speech recognition can be used as the server 200.

The second embodiment gives an example in which the sound collector 130 transmits both the first synthetic speech converted from the speech input direction information and the user's speech to the server 200, the server 200 creates a command signal based on the first synthetic speech and the user's speech, and the server 200 transmits the command signal to the content reproducer 100B. The content reproduction system 300B, however, may have a configuration in which the sound collector 130 transmits the speech input direction information directly to the content reproducer 100B without generating the first synthetic speech, and transmits the user's speech to the content reproducer 100B via the server 200. In this case, signal identification information is attached to each of the user's speech and the speech input direction information to enable the content reproducer 100B to associate a command signal transmitted from the server 200 with the speech input direction information transmitted from the sound collector 130 based on the signal identification information. This configuration enables the content reproducer 100B to associate each command signal with a piece of speech input direction information even when the user inputs a plurality of speeches. The content reproduction system 300B may have a configuration in which, when the sound collector 130 attaches the signal identification information to a speech uttered by the user, the sound collector 130 converts the signal identification information into a second synthetic speech, and transmits the second synthetic speech attached to the user's speech to the server 200. With the signal identification information transmitted as audio data to the server 200 by the sound collector 130, an existing internet server that conducts speech recognition can be used as the server 200.

When the sound collector 130 stores the axial misalignment information and the origin position misalignment information, and determines the content output direction based on the speech input direction information and the distance-to-user information, the content reproduction system 300B may have a configuration in which the sound collector 130 transmits information about the content output direction directly to the content reproducer 100B, and transmits the user's speech to the content reproducer 100B via the server 200. In this case, signal identification information is attached to each of the user's speech and the information about the content output direction to enable the content reproducer 100B to associate a command signal transmitted from the server 200 with the information about the content output direction transmitted from the sound collector 130 based on the signal identification information. This configuration enables the content reproducer 100B to associate each command signal with a piece of information about each content output direction even when the user inputs a plurality of speeches. The content reproduction system 300B may have a configuration in which, when the sound collector 130 attaches the signal identification information to a speech uttered by the user, the sound collector 130 converts the signal identification information into a second synthetic speech, and transmits the second synthetic speech attached to the user's speech to the server 200. With the signal identification information transmitted as audio data to the server 200 by the sound collector 130, an existing internet server that conducts speech recognition can be used as the server 200.

While the first embodiment and the second embodiment use configurations in which the content outputter 80 is included in the content reproducer 100 and the content reproducer 100B, a configuration in which the content outputter 80 is not included in the content reproducer 100 nor the content reproducer 100B may be employed. In that case, the origin position adjustment step S208 and the axis adjustment step S209 described above are applied to adjust the origin misalignment and axial misalignment of the content outputter 80 with respect to the content reproducer 100B.

The content reproduction system 300B may also have a configuration in which the sound collector 130 performs speaker recognition on the user's speech in the information obtaining step S201 so that the speech input direction information is obtained only in response to a speech of a specific user. This configuration enables the content reproducer 100B to determine the content output direction based on the speech input direction information of a specific user even when speeches of a plurality of users are input to the sound collector 130.

The content reproducer 100B in the example described in the second embodiment outputs content toward the speech input direction, namely, the direction of the user, based on the speech input direction information. The content reproducer 100B may be configured so that content is output in a direction opposite from the speech input direction, or in a direction that forms a given angle to the speech input direction.

What is claimed is:
1. A content reproducer, comprising:
a sound collector configured to collect a speech; and
a controller configured to obtain speech input direction information about the speech,
wherein the controller is further configured to convert the speech input direction information into a synthetic speech, transmit the speech collected by the sound collector and the synthetic speech to a server, receive a command signal from the server, and determine a content output direction based on the received command signal.

2. A sound collecting device, comprising:
a sound collector configured to collect a speech;
a controller configured to obtain speech input direction information about the speech; and
a communicator,
wherein the controller is configured to convert the speech input direction information into a synthetic speech, and the communicator is configured to transmit the speech collected by the sound collector and the synthetic speech to a server and to receive a command signal from the server, and
wherein the controller is further configured to determine a content output direction based on the received command signal.

3. A content reproduction system, comprising:
a sound collector configured to collect a speech uttered by a user and to obtain speech input direction information about the speech;
a content reproducer; and
a server,
wherein the sound collector is configured to convert the speech input direction information into a synthetic speech and transmit the speech collected by the sound collector and the synthetic speech to the server,
wherein the server is configured to generate a command signal based on the speech and the first synthetic speech that are transmitted from the sound collector, and
wherein the content reproducer is configured to receive the command signal from the server and determine a content output direction based on the speech input direction information that is contained in the received command signal.

4. A content reproduction system, comprising:
a sound collector configured to obtain speech input direction information, and transmit the speech input direction information; and
a content reproducer configured to receive the speech input direction information from the sound collector, and determine a content output direction based on the speech input direction information,
wherein the sound collector is configured to transmit a speech uttered by a user, with signal identification information attached to the speech, and transmit the speech input direction information obtained from the speech, with the signal identification information attached to the speech input direction information,
wherein the content reproduction system further comprises a server configured to generate a command signal based on the speech to which the signal identification information is attached, and
wherein the content reproducer is configured to receive the speech input direction information, to which the signal identification information is attached, and which is transmitted from the sound collector, and the command signal, which contains the signal identification information, and which is transmitted from the server, and associate the speech input direction information with the command signal based on the signal identification information.

5. The content reproduction system according to claim 4, wherein the sound collector is configured to, when attaching the signal identification information to the speech uttered by the user, convert the signal identification information into a second synthetic speech, attach the second synthetic speech to the speech uttered by the user, and transmit the speech uttered by the user to the server.

6. A content reproduction system, comprising:
a sound collector configured to obtain speech input direction information, and transmit the speech input direction information; and
a content reproducer configured to receive the speech input direction information from the sound collector, and determine a content output direction based on the speech input direction information,
wherein the content reproducer is configured to store at least one of origin misalignment information and axial misalignment information, which are information about misalignment with respect to the sound collector, and
wherein the content reproducer is configured to determine the content output direction based on at least one of the origin misalignment information and the axial misalignment information, and on the speech input direction information.

7. A content reproduction system, comprising:
a sound collector configured to obtain speech input direction information, and transmit the speech input direction information; and
a content reproducer configured to receive the speech input direction information from the sound collector, and determine a content output direction based on the speech input direction information,
wherein the sound collector is configured to transmit at least one of origin misalignment information and axial misalignment information, which are information about misalignment with respect to the content reproducer, and
wherein the content reproducer is configured to receive at least one of the origin misalignment information and the axial misalignment information, and determine the content output direction based on the received at least one of the origin misalignment information and the axial misalignment information, and on the speech input direction information.

8. A method of controlling a content reproducer, comprising:
collecting a speech;
obtaining speech input direction information about the collected speech;
converting the speech input direction information into a synthetic speech;
transmitting the collected speech and the synthetic speech to a server;
receiving a command signal from the server; and
determining a content output direction based on the received command signal.

* * * * *